(12) United States Patent
Zhao et al.

(10) Patent No.: US 9,217,086 B2
(45) Date of Patent: Dec. 22, 2015

(54) METHOD OF FABRICATING TRANSPARENT ANTI-REFLECTIVE ARTICLE

(71) Applicant: Wayne State University, Detroit, MI (US)

(72) Inventors: Yang Zhao, Novi, MI (US); Jinsong Wang, Madison Heights, MI (US)

(73) Assignee: Wayne State University, Detroit, MI (US)

( * ) Notice: Subject to any disclaimer, the term of this patent is extended or adjusted under 35 U.S.C. 154(b) by 209 days.

(21) Appl. No.: 13/858,453

(22) Filed: Apr. 8, 2013

(65) Prior Publication Data
US 2013/0230807 A1  Sep. 5, 2013

Related U.S. Application Data

(60) Division of application No. 12/404,863, filed on Mar. 16, 2009, now abandoned, which is a continuation-in-part of application No. 12/050,807, filed on Mar. 18, 2008, now abandoned, which is a (Continued)

(51) Int. Cl.
*C09D 5/00* (2006.01)
*C03C 17/28* (2006.01)

(52) U.S. Cl.
CPC .................. *C09D 5/006* (2013.01); *C03C 17/28* (2013.01); *C03C 2217/732* (2013.01); *C03C 2217/76* (2013.01); *C03C 2217/77* (2013.01)

(58) Field of Classification Search
CPC .............. G02F 1/133502; G02F 2001/133565; G02F 1/133504; H01L 31/0232; H01L 51/5268; H01L 51/5275; H01L 31/02168; H01L 27/1462; H01L 27/14625; G02B 26/001; G02B 1/11; G03F 7/091; G03F 7/70191

USPC .................................. 430/320, 321, 322, 296
See application file for complete search history.

(56) References Cited

U.S. PATENT DOCUMENTS 3,354,022 A  11/1967  Dettre et al.
5,324,566 A   6/1994  Ogawa et al.
(Continued)

OTHER PUBLICATIONS

H.Y. Erbil, A.L. Demirel, Yonca Avci, and O. Mert., Science, 299, 1377, (2003).

(Continued)

*Primary Examiner* — Caleen Sullivan
(74) *Attorney, Agent, or Firm* — Brinks Gilson & Lione

(57) ABSTRACT

A method of fabricating an anti-reflective optically transparent structure includes the steps of providing an optically transparent substrate having a first refractive index and a first surface; and forming an anti-reflective layer within the first surface of the transparent substrate. The anti-reflective layer is made by forming a nano-scale pattern within the first surface defining a subwavelength nano-structured second surface of the anti-reflective layer including a plurality of protuberances having a predetermined maximum distance between adjacent protuberances and a predetermined height for a given wavelength such that the anti-reflective layer includes a second refractive index lower than the first refractive index to minimize light diffraction and random scattering therethrough. The predetermined height is approximately equal to a quarter of the given wavelength divided by the second refractive index. One of nanosphere lithography, deep ultraviolet photolithography, electron beam lithography, and nano-imprinting may be used to form the anti-reflective layer.

7 Claims, 2 Drawing Sheets

Related U.S. Application Data continuation of application No. PCT/US2006/036187, filed on Sep. 15, 2006.

(60) Provisional application No. 60/718,587, filed on Sep. 19, 2005.

(56) References Cited

U.S. PATENT DOCUMENTS

| | | | |
|---|---|---|---|
| 5,324,591 | A | 6/1994 | Georger, Jr. et al. |
| 5,674,592 | A | 10/1997 | Clark et al. |
| 5,858,284 | A | 1/1999 | Konuma et al. |
| 5,872,441 | A | 2/1999 | McCann |
| 6,284,377 | B1 | 9/2001 | Veerasamy |
| 6,514,674 | B1 | 2/2003 | Iwasaki |
| 6,640,034 | B1 | 10/2003 | Charlton et al. |
| 6,649,266 | B1 | 11/2003 | Gross et al. |
| 6,660,363 | B1 | 12/2003 | Barthlott |
| 6,683,126 | B2 | 1/2004 | Keller et al. |
| 6,764,745 | B1 | 7/2004 | Karasawa et al. |
| 6,800,354 | B2 | 10/2004 | Baumann et al. |
| 6,811,856 | B2 | 11/2004 | Nun et al. |
| 6,934,080 | B2 | 8/2005 | Saccomanno et al. |
| 7,077,903 | B2 | 7/2006 | Babich et al. |
| 7,128,966 | B2 | 10/2006 | Hattori |
| 7,170,666 | B2 | 1/2007 | Piehl et al. |
| 7,227,684 | B2 | 6/2007 | Wang et al. |
| 7,241,472 | B2 | 7/2007 | Arai |
| 7,241,505 | B2 | 7/2007 | Glaubitt et al. |
| 2002/0179827 | A1 | 12/2002 | Kimura |
| 2003/0102286 | A1 | 6/2003 | Takahara et al. |
| 2004/0067339 | A1 | 4/2004 | Gandon et al. |
| 2004/0081798 | A1 | 4/2004 | Lee et al. |
| 2004/0125266 | A1 | 7/2004 | Miyauchi et al. |
| 2004/0191480 | A1 | 9/2004 | Karasawa et al. |
| 2005/0074579 | A1 | 4/2005 | Suzuki et al. |
| 2005/0095699 | A1 | 5/2005 | Miyauchi et al. |
| 2005/0181195 | A1 | 8/2005 | Dubrow |
| 2006/0278883 | A1 | 12/2006 | Negley |
| 2007/0238298 | A1 | 10/2007 | Brown |

OTHER PUBLICATIONS

A. Nakajima, K. Hashimoto, T. Watanabe, Monatsh. Chem. 132, 31 (2001).
S.R. Coulson, et al., J. Phys. Chem. B 104, 8836 (2000).
W. Chen, et al., Langmuir 15, 3395 (1999).
S. Veeramasuneni, J. Drelich, J.D. Miller, G. Yamauchi, Prog. Org. Coat. 31, 265 (1997).
T. Nishino, M. Meguro, K. Nakamae, M. Matsushita, Y. Ueda, Langmuir 15, 4321 (1999).
S. Shibuichi, T. Onda, N. Satoh, K. Tsujii, J. Phys. Chem. B 100, 19512 (1996).
A. Oner and T.J. McCarthy, Langmuir 16, 7777 (2000).
A. Hozumi and O. Takai, thin Solid Films 334, 54 (1998).
T. Tadnaga, N. Katata, T. Minami, J. Am. Ceram. Soc. 80, 1040 (1997).
X. Wang, C.J. Summers, and Z.L. Wang, "Large-Scale Hexagonal-Patterned Growth of Aligned ZnO Nanorods for Nano-optoelectronics and Nanosensor Arrays", Nano Letters 2004, vol. 4, No. 3, pp. 423-426. Jan. 11, 2004.
Y. Zhao, J. Wang, "Colloidal subwavelength nanostructures for antireflection optical coatings", Optics Letters 2005, vol. 30, No. 14, pp. 1885-1887.
J. Wang, Y. Zhao, G. Mao, "Engineering photonic nanostructure profiles using nanosphere lithography and reactive-ion etching", Dept. of Elect. and Computer Engineering.
J. Hulteen, R. Van Duyne, "Nanosphere Lithography: A materials general fabrication process for periodic particle array surfaces", Department of Chemistry and Materials Research Center, Dec. 19, 1994, pp. 1553-1558.

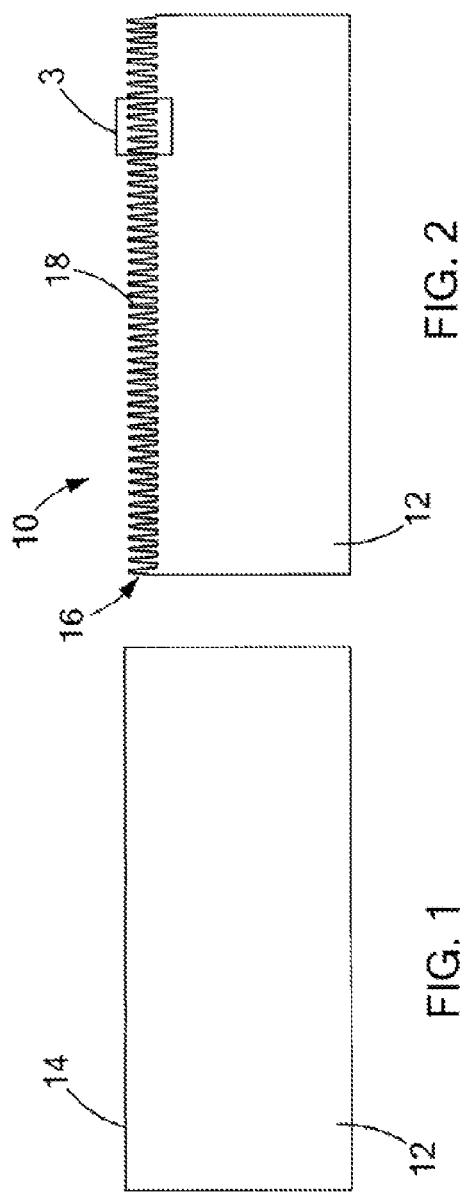
FIG. 1
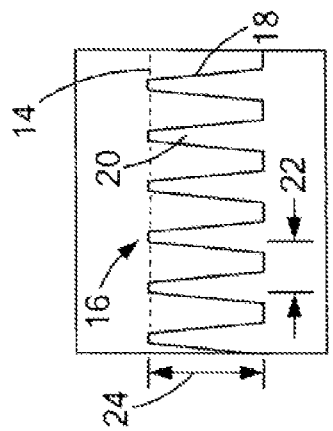
FIG. 3
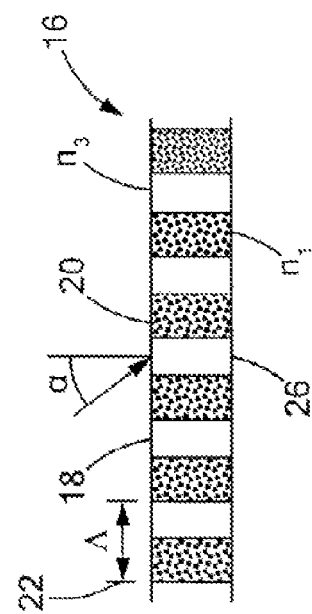
FIG. 2
FIG. 4

METHOD OF FABRICATING TRANSPARENT ANTI-REFLECTIVE ARTICLE

CROSS-REFERENCE TO RELATED APPLICATIONS

This application is a division of U.S. application Ser. No. 12/404,863 filed on Mar. 16, 2009, entitled "TRANSPARENT ANTI-REFLECTIVE ARTICLE AND METHOD OF FABRICATING SAME," which is a continuation-in-part of U.S. application Ser. No. 12/050,807 filed on Mar. 18, 2008, entitled "TRANSPARENT HYDROPHOBIC ARTICLE HAVING SELF-CLEANING AND LIQUID REPELLANT FEATURES AND METHOD OF FABRICATING SAME," which is a continuation of International Application No. PCT/US2006/036187 filed on Sep. 15, 2006, entitled "TRANSPARENT HYDROPHOBIC ARTICLE HAVING SELF-CLEANING AND LIQUID REPELLANT FEATURES AND METHOD OF FABRICATING SAME" and claims the benefit of U.S. Provisional Application Ser. No. 60/718,587 filed on Sep. 19, 2005, entitled "TRANSPARENT HYDROPHOBIC ARTICLE HAVING SELF-CLEANING AND LIQUID REPELLANT FEATURES AND METHOD OF FABRICATING SAME," the entire contents of each are incorporated herein by reference.

BACKGROUND OF THE INVENTION

The present invention relates to transparent articles having an anti-reflection surface and method of fabricating a transparent anti-reflective structure.

Transparent electronic display screens made of glass or plastic, such as cell phone screens, computer screens, and TV monitors including liquid crystal displays (LCD), are difficult to view as external ambient light reflects off their surface. Researchers and engineers have worked on several techniques to minimize this reflection using various screen surfaces, including anti-glare and anti-reflection screens.

Most anti-glare screens use a treatment on their top surface to diffuse the reflected light from external lighting sources. This treatment consists of laminating a matte surface layer having a micrometer-scaled roughness to the screen surface. As light hits the rough surface, it bounces off at different angles, which reduces the intensity of light reflecting off of the surface and hitting a viewer's eyes. While this reduces the intensity of light, it does, however, leave a hazy image of the reflection which may block the onscreen image. This treatment also distorts the image generated by the LCD.

Alternatively, anti-reflection screens do not have a rough matte anti-glare surface. Rather, anti-reflection screens use an anti-reflective coating material, such as magnesium fluoride ($MgF_2$), to reduce the reflected light by lowering the refractive index of the surface of the display panel to more closely approximate that of air. This process is known as index matching. This reduces the reflection and refraction of ambient light as it hits the surface of the display screen. Compared to anti-glare screens, the smooth gloss finish of an anti-reflection screen results in a crystal clear image. Anti-reflection screens also have a wider view angle and produce images with higher contrast and richer colors. However, there are very few transparent coating materials available with a low refractive index for index matching. Furthermore, it is difficult to find a transparent coating material to match the particular range of most glass and polymers.

Thus, there is a need for transparent articles having anti-reflection surfaces for devices such as electronic display screens, optical sensors, and solar cells.

BRIEF SUMMARY OF THE INVENTION

The present invention provides a method of fabricating an anti-reflective optically transparent structure comprises providing an optically transparent substrate having a first refractive index and a first surface. The method further includes forming an anti-reflective layer within the first surface of the transparent substrate which includes forming a nano-scale pattern within the first surface defining a subwavelength nano-structured second surface of the anti-reflective layer including a plurality of protuberances. Such protuberances have relatively similar shape and size, as well as a predetermined maximum distance between adjacent protuberances and a predetermined height for a given wavelength such that the anti-reflective layer includes a second refractive index lower than the first refractive index to minimize light diffraction and random scattering therethrough. The predetermined height is approximately equal to a quarter of the given wavelength divided by the second refractive index.

In further embodiments of the present invention, a hydrophobic coating may be applied on the subwavelength nano-structured surface as described in U.S. application Ser. No. 12/050,807 filed on Mar. 18, 2008. In this embodiment, a transparent structure includes a super-hydrophobic anti-reflective surface.

Further objects, features, and advantages of the present invention will become apparent from consideration of the following description and the appended claims when taken in connection with the accompanying drawings.

BRIEF DESCRIPTION OF THE DRAWINGS

FIG. 1 is a side view of a transparent substrate without an anti-reflective layer;

FIG. 2 is a side view of a transparent article having an anti-reflective layer in accordance with one embodiment of the present invention;

FIG. 3 is an enlarged view of section 3 in FIG. 2 of the transparent anti-reflective article;

FIG. 4 is a side view of a subwavelength nano-structured surface of the anti-reflective layer depicting an incident angle in accordance with one embodiment of the present invention;

DETAILED DESCRIPTION OF THE INVENTION

Figure 5:
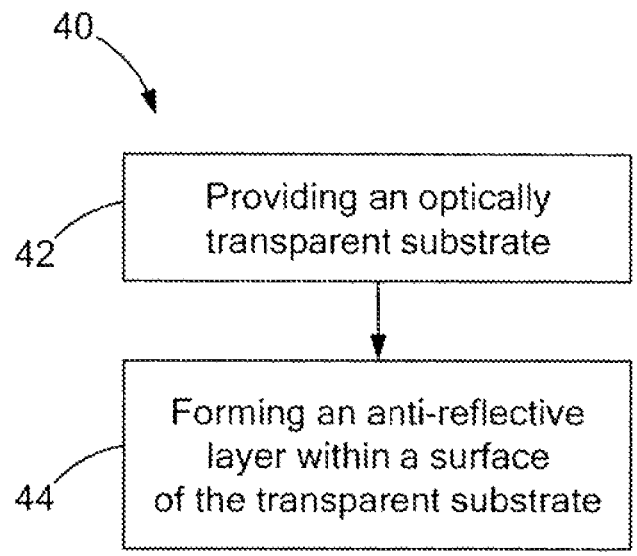
FIG. 5 is a flow chart depicting a method of fabricating an anti-reflective transparent structure in accordance with an embodiment of the present invention.

The present invention generally provides an anti-reflective transparent article. The anti-reflective transparent article may be used in display screens for computer and television monitors, cell phones, cameras, and pocket PCs. The anti-reflective transparent article may also be used in optical sensors and solar cells. In one embodiment, the article comprises a transparent substrate having an anti-reflective layer including a subwavelength nano-structured surface having a plurality of protuberances. The subwavelength nano-structured surface is preferably formed through use of a nanosphere lithography technique. The subwavelength nano-structured surface lowers the refractive index of the transparent substrate and thus reduces the reflection of ambient light.

FIG. 1 illustrates a transparent substrate 12 having a first surface 14 and a refractive index $n_1$. FIG. 2 illustrates an anti-reflective transparent article 10 in accordance with one embodiment of the present invention. As shown, the article 10 comprises the transparent substrate 12 of FIG. 1 having an anti-reflective layer 16 formed within the first surface 14 thereof. The anti-reflective layer 16 includes a subwavelength nano-structured surface 18 including a plurality of protuberances 20. As illustrated in FIG. 3, the anti-reflective layer 16 is formed into the transparent substrate 12, i.e., within the first surface 14 of the transparent substrate 12, through use of dashed line 14 to show the that first surface 14 has been modified to the nano-structured surface 18 defining the anti-reflective layer 16. As depicted, the subwavelength nano-structured surface 18 is corrugated. In this embodiment, each protuberance 20 includes a base and slightly tapers to an end. The protuberances 20 have relatively similar shape and size. Each protuberance 20 may take on a number of shapes including conical, cylindrical, or tapered shapes with an arcuate or a pointed end without falling beyond the scope or spirit of the present invention.

Preferably, each protuberance 20 has a predetermined maximum distance 22 to the adjacent neighbor for a given range of operation wavelengths. Such properties function to minimize light diffraction and random light scattering therethrough to define the transparent and anti-reflective properties of the article 10. Preferably, the predetermined distance 22 is such that the fraction of volume occupied by the protuberances 20 leads to an effective refractive index $n_2$ of the anti-reflective layer 16 lower than the refractive index n1 of the transparent substrate 12 without the anti-reflective layer 16. Preferably, the refractive index $n_2$ of the anti-reflective layer 16 is equal to or close to the square root of refractive index $n_1$ of the substrate 12.

In this embodiment, the predetermined maximum distance 22 between two adjacent protuberances 20 of the nano-structured surface 18 of the transparent substrate 12 may be up to about a few hundred nanometers. The predetermined maximum distance 22 between two adjacent protuberances may be between about 50 nm and 500 nm, preferably between about 100 nm and 400 nm, and most preferably about 300 nm for visible wavelengths. The predetermined height 24 of the protuberances 20 is equal to a quarter of the given wavelength divided by $n_2$ so that there is minimum reflection for spectrum centered at that wavelength. For example, for visible light, there is a central wavelength of around 550 nm and if $n_1$ of the transparent substrate 12 is 1.69, then $n_2$ of the anti-reflective layer 16 is preferably 1.3 (i.e., the square root of 1.69) and the desired height 24 should therefore be around 106 nm (i.e., ¼ of 550 nm, divided by 1.3).

Referring now to FIG. 4, the predetermined maximum distance 22 between two adjacent protuberances 20 may be defined as:

$$\Lambda < \lambda / [\max(n_3, n_1) + n_3 \sin(\alpha)],$$

wherein $\lambda$ represents the incident (operation) wavelength, angle $\alpha$ represents the incident angle, and $\Lambda$ represents the distance 22 between two adjacent protuberances 20 thereof, and argument $n_3$ represents the refractive index of the medium above the subwavelength nano-structured surface 18 (i.e., the refractive index of air) and argument $n_1$ represents the refractive index of the medium below the surface 26 opposite the subwavelength nano-structured surface 18 (i.e., the refractive index of the substrate 12), and wherein max represents the maximum of the arguments $n_1$ and $n_3$.

For example, if $n_3$ is equal to 1 (i.e., the refractive index of air) and the refractive index $n_1$ of the substrate 12 is equal to 1.5, and $\lambda$ is equal to 500 nm, and a is equal to 30 degrees, then $\Lambda$ should be less than about 250 nm.

FIG. 5 depicts a flow chart of a method 40 for fabricating an anti-reflective optically transparent structure in accordance with one example of the present invention. In one example, an optically transparent substrate 12 is provided in box 42. The transparent substrate 12 has a first refractive index $n_1$ and a first surface 14. The method 40 further comprises forming, in box 44, an anti-reflective layer 16 within the first surface 14 of the transparent substrate 12. This includes forming a nano-scale pattern within the first surface 14 of the transparent substrate to define a subwavelength nano-structured second surface 18 of the anti-reflective layer 16.

Preferably, a nanosphere lithography technique is implemented to accomplish this. Such a technique includes several steps. First, the transparent substrate 12 is cleaned using standard methods, such as the conventional RCA process. Second, a colloidal suspension with nanoparticles is deposited onto the first surface 14 of the transparent substrate 12. The colloidal suspension may include, for example, monodisperse polystyrene nanoparticles, with diameters ranging from about 170 nm to about 300 nm, diluted with DI water. The nanoparticles are deposited onto the transparent substrate 12 via conventional drop-coating or spreading coating methods or any other suitable method known in art. After evaporation of water in the colloidal nanoparticles, close-packed monolayers of nanospheres are formed on the first surface 14 of the transparent substrate 12.

After the formation of the nanosphere monolayer masks, two following etching steps are performed. A first etching step is used to reduce the nano-particles to a desired size (diameter) and shape profile. Preferably, this first etching step is implemented to create the desired volume fraction of the protuberances 20 to achieve the desired effective refractive index $n_2$ of the anti-reflective layer 16. For example, the size (diameter) of the masking nanospheres may be reduced via oxygen and fluorocarbon gases RIE in the first etching step.

Next, a second etching step is used to etch the transparent substrate 12 to create protuberances 20 with desired height 24 within the first surface 14 of the substrate 12, thus modifying the surface of the transparent substrate 12 from the first surface 14 to the second subwavelength nano-structured surface 18, thereby defining the anti-reflective layer 16 which has a lower refractive index $n_2$ than the refractive index $n_1$ of the transparent substrate 12 without the anti-reflective layer 16. For example, a second fluorocarbon gas RIE may be used to etch the transparent substrate 12 to transfer the mask patterns onto the surface 14, thus modifying the surface 14 with the mask patterns to provide the anti-reflective layer 16 having a subwavelength nano-structured surface 18 and the reduced refractive index $n_2$. The anti-reflective layer 16 defined by the subwavelength nano-structured surface 18 including a plurality of protuberances 20. Such protuberances 20 have relatively similar shape and size, as well as a predetermined maximum distance 22 between adjacent protuberances 20 and a predetermined height 24 for a given wavelength to minimize light diffraction and random light scattering therethrough. The predetermined height 24 is equal to a quarter of the given wavelength divided by $n_2$.

The free parameters of the nano-structured surface 18 include the material refractive index $n_1$ of the transparent substrate 12; the size of the protuberances 20, which determines the thickness, or height 24, of the anti-reflective layer 16; and the volume fraction of the protuberances 20. By properly choosing these parameters, the effective refractive index $n_2$ of the anti-reflective layer 16 can be controlled to achieve total cancellation of reflection at a certain wavelength. For example, etching parameters may be adjusted to control the desired height and refractive index $n_2$. Specifically, etching time, etching gas flow rates and mixture ratio can be adjusted to obtain the desired parameters mentioned above.

After this second etching step, the remaining nano-particles are washed off. Thus, the anti-reflective layer 16 is formed into the transparent substrate 12, modifying the first surface 14 to the second subwavelength nano-structured surface 18, and the antireflective layer 16 is therefore the same material as the transparent substrate 12 as opposed to a film or coating of a different material on the top surface of the transparent substrate 12. In effect, the subwavelength nano-structured surface 18 acts as an anti-reflection coating layer on the transparent substrate 12. However, it is not a coating, but rather a patterned surface 18 with the same material as that of the transparent substrate 12 which therefore comprises anti-reflection features.

Based on the effective medium theory, suppose $V_{Sub}$ is the filling factor (volume fraction) of the protuberances 20 in these 2D nanostrucures, the effective refractive index of the subwavelength structured surface 18 (for polarization TE and TM) is given by:

$$n_{eff}^{TE} = \sqrt{V_{Sub} \times n_{Sub}^2 + (1 - V_{Sub}) \times n_{Air}^2} \qquad (1)$$

$$n_{eff}^{TM} = \sqrt{V_{Sub} \times \frac{1}{n_{Sub}^2} + (1 - V_{Sub}) \times \frac{1}{n_{Air}^2}} \qquad (2)$$

It is seen that by proper value of $V_{Sub}$, we can obtain the desired effective refractive index.

While the present invention most preferably utilizes a nanosphere lithography technique and etching to form the subwavelength nano-structured surface 18 of the anti-reflective layer 16, other techniques known in the art may be implemented to accomplish this. For example, the following techniques may be implemented: deep ultra-violet photolithography and etching; electron beam lithography and etching; and nano-imprinting lithography.

Figure 6:
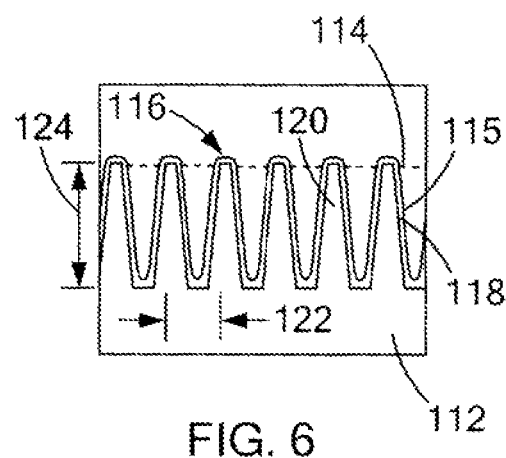
FIG. 6 is an enlarged side view of a transparent anti-reflective hydrophobic article in accordance with an embodiment of the present invention.

Referring to FIG. 6, a further embodiment of the present invention includes a hydrophobic anti-reflective article including a hydrophobic coating 115 applied on a subwavelength nano-structured surface 118 of a transparent substrate 112. In this embodiment, the transparent substrate 112 includes an anti-reflective layer 116 including a subwavelength nano-structured surface 118, as described in accordance with the anti-reflective layer 16 of the embodiments depicted in FIGS. 1-4 and the method described in FIG. 5. A hydrophobic coating 115, as described in U.S. application Ser. No. 12/050,807 filed on Mar. 18, 2008, is applied on the subwavelength nano-structured surface 118. Thus, a super-hydrophobic anti-reflective transparent article is obtained by applying a hydrophobic coating 115 to a transparent substrate 112 having an anti-reflective layer 116 defined by a subwavelength nano-structured surface 118 including a plurality of protuberances 120 with a predetermined height 124 approximately equal to a quarter of the given wavelength divided by the effective refractive index $n_2$ of the anti-reflective layer 116, wherein the resultant effective refractive index $n_2$ of the anti-reflective layer 116 is approximately equal to the square root of the refractive index $n_1$ of the transparent substrate 112 without the subwavelength nano-structured surface 118 formed within the first surface 114 of the transparent substrate 112. In this embodiment, the hydrophobic coating 115 may be applied to the subwavelength nano-structured surface 118 by spin coating or any other method described in U.S. application Ser. No. 12/050,807 or any other suitable method known in the art.

While the present invention has been described in terms of preferred embodiments, it will be understood, of course, that the invention is not limited thereto since modifications may be made to those skilled in the art, particularly in light of the foregoing teachings.

The invention claimed is:

1. A method of fabricating an anti-reflective optically transparent structure, the method comprising:
    providing an optically transparent substrate having a first refractive index and a first surface; and
    forming an anti-reflective layer within the first surface of the transparent substrate which includes forming a nano-scale pattern within the first surface defining a subwavelength nano-structured second surface of the anti-reflective layer including a plurality of protuberances having a predetermined maximum distance between adjacent protuberances and a predetermined height for a given wavelength such that the anti-reflective layer includes a second refractive index lower than the first refractive index to minimize light diffraction and random scattering therethrough, wherein the predetermined height is approximately equal to a quarter of the given wavelength divided by the second refractive index, and wherein nanosphere lithography is used to form the anti-reflective layer.

2. The method of claim 1, wherein the second refractive index is approximately equal to the square root of the first refractive index.

3. The method of claim 1, wherein the predetermined maximum distance between adjacent protuberances is defined as:

$$\Lambda < \lambda / [\max(n_3, n_1) + n_3 \sin(\alpha)],$$

wherein $\lambda$ represents an incident wavelength and $\Lambda$ represents the distance between two adjacent protuberances thereof, wherein argument $n_1$ represents the first refractive index and argument $n_3$ represents a third refractive index of a medium above the anti-reflective second surface, and wherein max represents the maximum of the arguments.

4. The method of claim 1, wherein the predetermined maximum distance between adjacent protuberances is between about 50 and 500 nm.

5. The method of claim 1, wherein the transparent substrate comprises at least one of the following components: glass, high density polyethylene, polypropylene, polymeric material, polyvinyl chloride, quartz, transparent dielectric, or diamond, or a mixture thereof.

6. The method of claim 1, wherein the transparent substrate is a display screen, wherein the display screen includes one of a cell phone screen, a computer monitor screen, a television monitor screen, and a liquid crystal display (LCD) screen.

7. The method of claim 1, further comprising:
    coating the subwavelength nano-structured second surface with a layer of hydrophobic material having a predetermined hydrophobicity.

* * * * *